Aug. 4, 1959 J. F. DENBY 2,898,583
CIRCUIT ARRANGEMENTS FOR CONVERTING INFORMATION FROM ONE FORM TO ANOTHER
Filed July 17, 1956
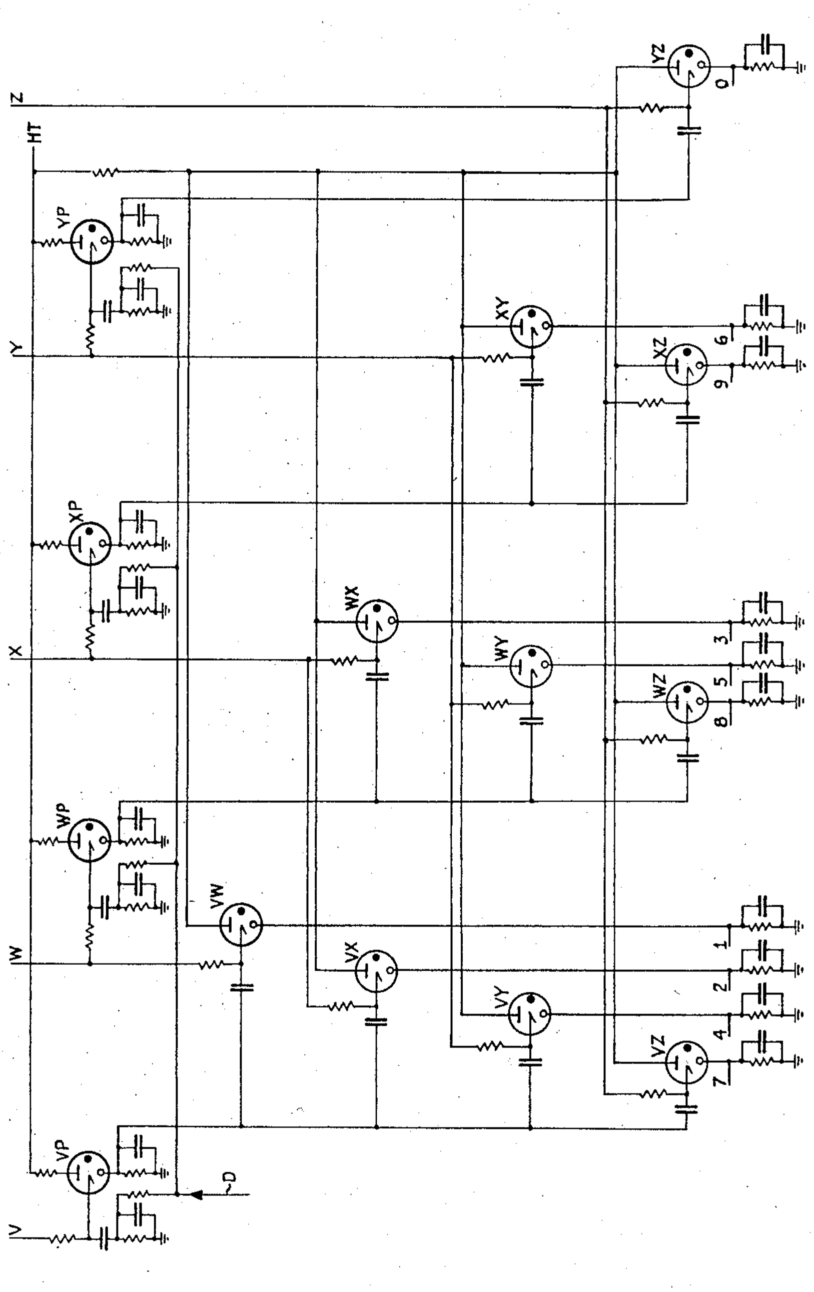
Inventor
JAMES FREDERICK DENBY
By
Young, Emery & Thompson Attorneys 2,898,583
Patented Aug. 4, 1959

2,898,583

CIRCUIT ARRANGEMENTS FOR CONVERTING INFORMATION FROM ONE FORM TO ANOTHER

James Frederick Denby, Liverpool, England, assignor to Automatic Telephone & Electric Company Limited, Liverpool, England, a British company Application July 17, 1956, Serial No. 598,382

Claims priority, application Great Britain August 6, 1955

1 Claim. (Cl. 340—347)

The present invention relates to circuit arrangements for converting information such as digits from one form to another and is more particularly concerned with the conversion from a first form in which the digtis are represented by markings on a particular number of a plurality of leads to a second form in which the digits are represented by a marking potential on one of a second plurality of leads, the total number of leads in the first plurality being less than the total number of leads in the second plurality.

In automatic telephone practice the manipulation of digits is frequently effected with the digits in coded form. It may however be necessary to convert the digits from the coded form to a different form, for instance, to the decimal form.

The object of the invention is the provision of improved circuit arrangements for effecting such conversion.

According to the invention, in circuit arrangements for converting digits from a first form in which the digits are represented by markings on a particular combination of a plurality of leads to a second form in which the digits are represented by a marking on one of a second plurality of leads each of the second plurality of leads is arranged to be marked on the striking of a cold cathode gas discharge tube individual thereto, a gas discharge tube corresponding to a digit in the second form being controlled to strike by potentials derived from the markings present on the particular combination of the first plurality of leads representing the digit in the first form.

According to a feature of the invention, in circuit arrangements for converting a digit marking comprising potentials at two of a set of five input leads to a marking comprising a potential at an appropriate one of a set of ten output leads each of a first plurality of cold cathode tubes is adapted when conducting to apply a marking potential to an individual one of said output leads, the conduction of such a tube being due to the combined effect of one potential extending to it directly from one of the two marked input leads and a second potential also connected to it upon conduction of one of a second plurality of cold cathode tubes which is controlled by the potential applied to the second marked input lead.

According to another feature of the invention, in a digit marking conversion circuit in which the digit information applied as potential markings to two leads of one set of leads is reproduced as a potential marking to one of a second set of leads the significant potential at one of the second set of ten leads, is obtained by the firing of a gas discharge tube individual to it, the firing of said tube being due to the combined effect of a priming potential derived from one of the two marked input leads and a pulse potential derived from a gas discharge tube individual to the other of the marked input leads.

The invention will be better understood from the following description of one embodiment taken in conjunction with the accompanying drawing. In the drawing the leads V, W, X, Y and Z are the five leads by which the digits are fed to the circuit by the application of potential to two of these leads.

The leads 1–0 are the output leads by which the digit is presented to subsequent equipment by the application of potential to one of the leads.

With regard to the code used for the incoming digits this is in accordance with the following table:

| Digits: | Leads marked |
|---|---|
| 1 | VW |
| 2 | VX |
| 3 | WX |
| 4 | VY |
| 5 | WY |
| 6 | XY |
| 7 | VZ |
| 8 | WZ |
| 9 | XZ |
| 0 | YZ |

Each of the outgoing leads 1 to 0 has associated therewith a gas discharge tube and it will be appreciated that as a marking potential is received over each of two of the leads V to Z the two potentials applied from the appropriate two of the leads V to Z, may be employed as bias and pulse potentials to cause the striking of the gas discharge tube individual to the outgoing lead.

The method employed in applying the pulse and bias potential is based on the previously shown table. Where a lead in this table is shown in the left-hand position of a pair, then the pulse potential for the individual tube is obtained from this lead while the bias potential is obtained from the lead shown in the right-hand position of the pair. Thus the positive potential on lead V will provide the pulse potentials for the individual tubes associated with outgoing leads 1, 2, 4 and 7. The positive potential on lead W will provide the pulse potentials for the individual tubes associated with outgoing leads 3, 5 and 8 and the biasing potential for the individual tube associated with outgoing lead 1. The positive potential on lead X will provide the pulse potentials for the individual tubes associated with outgoing leads 6 and 9 and the biasing potentials for the individual tubes associated with outgoing leads 2 and 3. The positive potential on lead Y will provide the pulse potential for the individual tube associated with outgoing lead 0 and the biasing potentials for the tubes associated with outgoing leads 4, 5 and 6. Finally the positive potential on lead Z will provide the biasing potentials for the tubes associated with outgoing leads 7, 8, 9 and 0.

The biasing potentials are applied from the leads directly to the trigger electrodes of the individual tubes but the pulse potentials are applied through pulse repeating tubes. The pulse repeating tubes are shown as VP, WP, XP and YP for leads V, W, X and Y while with regard to lead Z no pulse repeating tube is required since the positive potential over this lead is only used for biasing purposes and not for pulsing and it is therefore connected directly to the trigger electrodes of tubes VZ, WZ, XZ and YZ. The following table shows the effect of a positive potential on each of the leads V, W, X, Y and Z.

| Lead | Bias to Tube | Pulse to Tube |
|---|---|---|
| V | None | VW, VX, VY, VZ. |
| W | VW | WX, WY, WZ. |
| X | VX, WX | XY, XZ. |
| Y | VY, WY, XY | YZ. |
| Z | VZ, WZ, XZ, YZ | None. |

When conversion is to take place a pulse is applied to the trigger electrode of the four pulse repeating tubes and those two or that one which are or is primed will then strike. Suppose, for instance, that the digit 7 is represented on the leads V and Z by the application of a positive potential to leads V and Z. The positive potential on lead V will apply a priming potential to the trigger electrode of tube VP and the positive potential on lead Z will apply a priming potential to the trigger electrodes of tubes VZ, WZ, XZ and YZ.

When conversion is required, a positive potential is applied to lead D and this causes a pulse to be applied to the trigger electrodes of tubes VP, WP, XP and YP. Of these tubes only tube VP is primed so that only this tube strikes. In striking tube VP applies a pulse to tubes VW, VX, VY and VZ. Of these tubes only tube VZ is primed as previously described and this tube strikes and in striking causes a positive potential to be available at the cathode of tube VZ for application to lead 7. When the conversion operation is completed, the positive potential will be removed from the incoming leads and the conducting tubes will be extinguished, preferably by disconnecting the HT supply.

As a further example, suppose that digit 3 is presented by the incoming leads so that a positive potential is applied to leads W and X. The positive potential on lead W causes a priming potential to be applied to the trigger electrodes of tubes WP and VW while that on lead X causes a priming potential to be applied to the trigger electrodes of tubes XP, VX and WX. When conversion is required a positive potential is applied to lead D so that tubes VP, WP, XP and YP are pulsed. Of these tubes, tubes WP and XP strike since they are the only ones primed and tube WP in striking pulses tubes WX, WY and WZ. Of these tubes only tube WX is primed and this tube is the only one to strike. Tube XP in striking applies a pulse to tubes XY and XZ but since neither of these tubes are primed, neither strike. Tube WX in striking causes a positive potential to be applied to lead 3.

It is believed that the operation of the circuit to convert other digits from coded to decimal form will be readily understood from the above two examples with the assistance of the table given above showing the effect of the application of a positive potential to each of the leads V, W, X, Y and Z.

I claim:

Circuit arrangements for converting digits from a first form in which the digits are represented by markings on two of a first plurality of leads to a second form in which the digits are represented by a marking on one of a second plurality of leads comprising a first plurality of cold cathode gas discharge tubes each having an anode, a cathode and a trigger electrode and each connected to one of said second plurality of leads, means connecting the trigger electrode of each tube of said first plurality of tubes to one of said first plurality of leads whereby a priming potential is applied to the trigger electrode of at least one tube of said first plurality in response to the application of a marking to one of the leads of said first plurality, a second plurality of cold cathode gas discharge tubes each having an anode, a cathode and a trigger electrode, means connecting the trigger electrode of each of said second plurality of tubes to one of said first plurality of leads whereby a priming potential is applied to the trigger electrode of one tube of said second plurality in response to the application of a marking to the connected one of said first plurality of leads, means for applying a striking potential simultaneously to all the tubes of said second plurality, means responsive to the striking of a tube of said second plurality for applying a striking potential to at least one tube of said first plurality whereby one only of the primed tubes of said first plurality strikes and means responsive to the striking of one tube of said first plurality for applying a marking to the lead of the second plurality connected thereto.

References Cited in the file of this patent

UNITED STATES PATENTS

| | | |
|---|---|---|
| 2,686,224 | Hartley | Aug. 10, 1954 |
| 2,693,593 | Crosman | Nov. 2, 1954 |
| 2,784,049 | Mitchell | Mar. 5, 1957 |